May 10, 1955
J. G. LINDEMAN
2,707,907
TOOL CARRIER AND TRACTOR HITCH DEVICE
Filed March 16, 1951
2 Sheets-Sheet 1
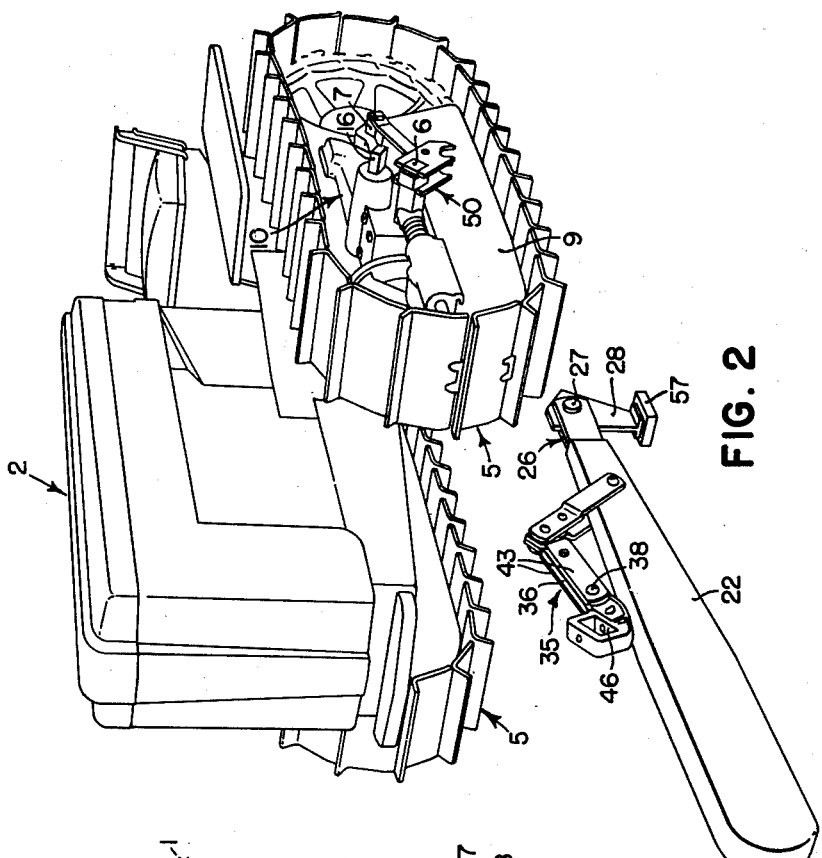
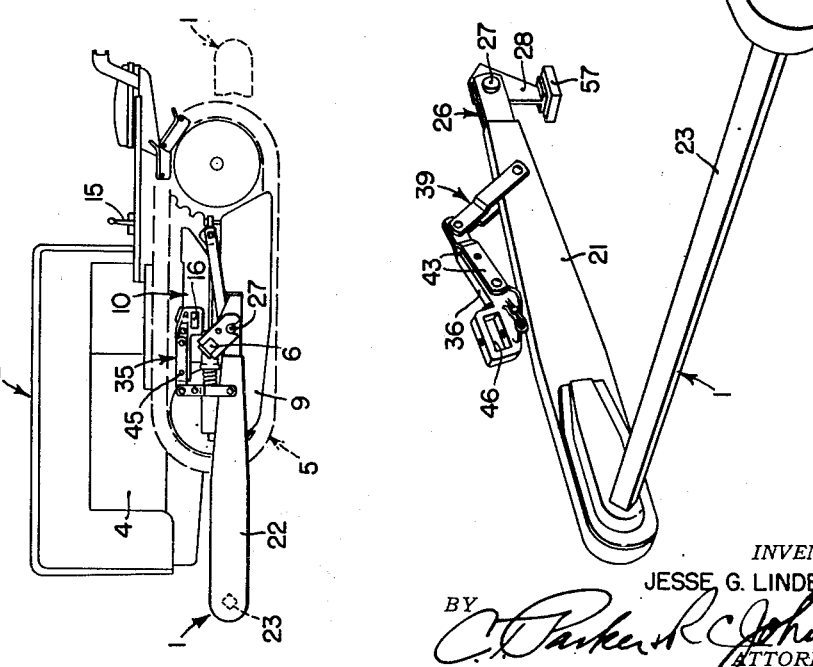
INVENTOR
JESSE G. LINDEMAN
BY
ATTORNEYS May 10, 1955   J. G. LINDEMAN   2,707,907
TOOL CARRIER AND TRACTOR HITCH DEVICE
Filed March 16, 1951   2 Sheets-Sheet 2

INVENTOR
JESSE G. LINDEMAN
BY
*Parker* *R C Johnson*
ATTORNEYS

United States Patent Office 2,707,907
Patented May 10, 1955

2,707,907

TOOL CARRIER AND TRACTOR HITCH DEVICE

Jesse G. Lindeman, Yakima, Wash., assignor to Deere & Company, Moline, Ill., a corporation of Illinois Application March 16, 1951, Serial No. 215,999

16 Claims. (Cl. 97—47.13)

The present invention relates generally to agricultural implements and more particularly to implements in the nature of a tool carrier adapted to support ground-working and other tools and to be detachably connected with a supporting tractor or the like.

The object and general nature of the present invention is the provision of an agricultural implement which is particularly adapted to be pivotally connected with a supporting tractor for operation of the power lift of the tractor. More particularly, it is a feature of this invention to provide a tool carrier having side arms or side beams adapted to be disposed alongside a supporting tractor and to be lifted off the ground and into operative engagement, for vertical swinging relative to the tractor, by operation of the tractor power lift. A further feature of this invention is the provision of an implement of this kind in which, after the implement is connected with the tractor by operation of the power lift, subsequent operation of the power lift serves to raise and lower the implement relative to the tractor. More specifically, it is a feature of this invention to provide means for raising an agricultural implement off the ground and up into operative connection with the tractor by operation of the power lift of the tractor, and means for detachably connecting the implement with the tractor so that, after the power lift has been actuated to raise the implement into connection with the tractor and the implement is locked in its connected position, the implement is free to swing generally vertically relative to the tractor.

Another important feature of the present invention is the provision of an implement which comprises a tool carrier that is adapted to be easily and quickly connected with a supporting tractor in either a front mounted or a rear mounted position, and in which connection is made in either position of the implement by utilizing the power lift of the tractor for raising the inner end of the implement up into engagement with the tractor irrespective of whether the implement is disposed at the front of the tractor or at the rear thereof.

These and other objects and advantages of the present invention will be apparent to those skilled in the art after a consideration of the following detailed description of the preferred structure, taken in conjunction with the accompanying drawings illustrating the presently preferred construction.

In the drawings:

Figure 1 is a side view of a tractor-mounted implement in which the principles of the present invention have been incorporated, the implement being shown in its attached position in which operation of the tractor power lift is adapted to raise and lower the implement frame.

Figure 2 is a perspective view showing the implement in its detached position and the position of the tractor just prior to being driven into connection relation with the implement.

Figure 3:
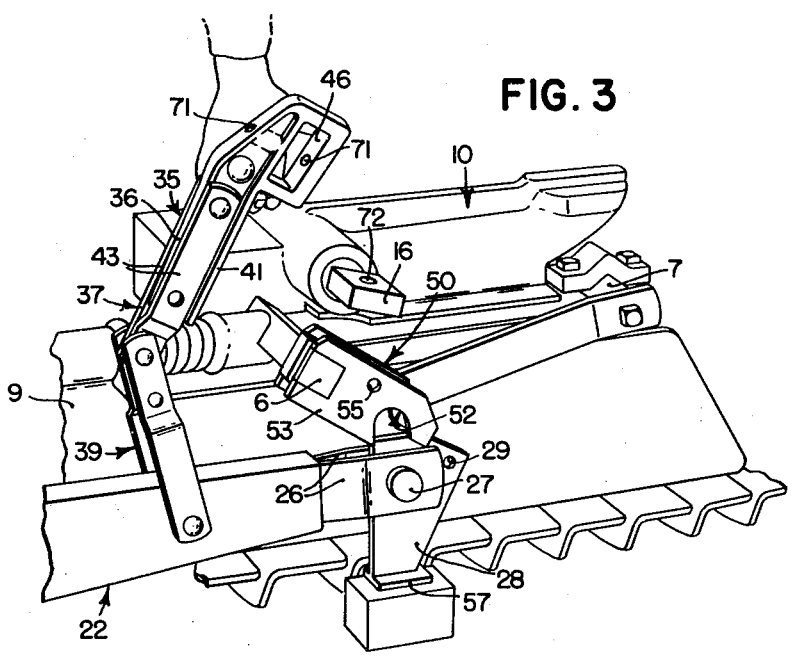
Figure 3 is a fragmentary perspective view showing the manner in which the lifting arms are connected to the power-actuated rockshafts on the tractor.
Figure 4:
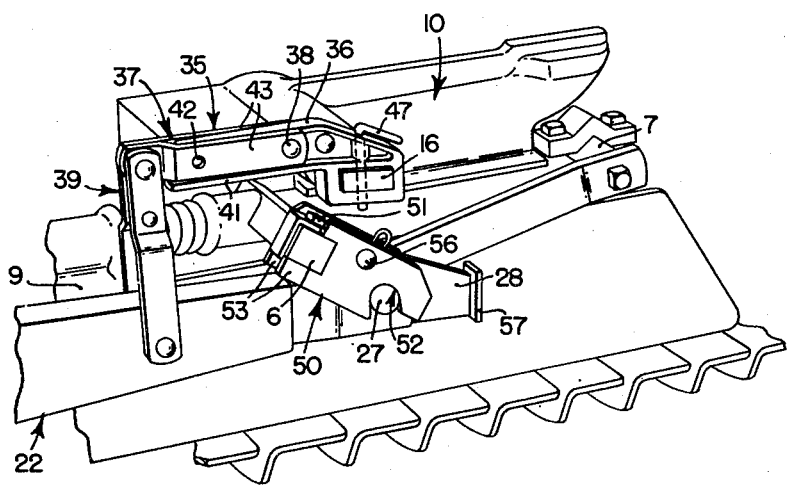
Figure 4 is a fragmentary view similar to Figure 3, showing the implement connected in operative relation with the tractor.

Referring first to Figure 1, the implement is indicated in its entirety by the reference numeral 1 and is shown as adapted for mounting on a tractor 2 which, as illustrated, may be of the crawler or track-laying type. The tractor 2 includes a power plant 4 which, together with associated clutch and transmission housings, constitutes the main body of the tractor, the latter being supported upon a pair of track units 5 by means of front and rear, transversely disposed crossbars 6 and 7, the track frames carrying suitable clamping means by which the track frames are fixed to the front and rear crossbars 6 and 7.

Each of the track units 5 includes the track frame, mentioned above and represented by the reference numeral 9, and each track frame carries a power unit 10, preferably in the form of a piston and cylinder unit of conventional construction so far as the present invention is concerned, each unit deriving power from a pump or the like driven by the tractor motor for and governed by valve mechanism under the control of a valve lever 15. Each power lift unit 10 also includes transversely disposed rockshaft means, and each of the latter includes a laterally outwardly extending movable section or part in the form of an operating member 16 that is non-circular in section, preferably being rectangular. Under the control of the valve lever 15, the rockshaft sections 16, there being one at each side of the tractor, may be rocked to raise or lower lifting arms connected therewith.

The rockshaft means 16 are disposed generally midway between the front and rear ends of the tractor and adjacent the forward main supporting crossbar 6, which latter member extends laterally outwardly farther than the rear crossbar 7.

As best shown in Figure 2, the implement 1 includes frame means having right- and left-hand side bars or side beams 21 and 22 interconnected rigidly at their forward ends by a crossbar 23. By means of suitable attaching structure, which does not form a part of the present invention, one or more of a variety of tool means may be attached to the crossbar so as to form a part of the implement 1. The rear end of each side beam is formed as a bifurcated section 26 in which a transverse pivot pin 27 is fixed, the pivot pin extending at its ends beyond the associated side beam sections. Mounted on each pivot pin 27, and between the aforesaid sections, is a swingable member 28 forming a combined ground-engaging supporting member and a side beam lock plate. Preferably, each member 28 is apertured to receive the associated pivot pin 27 and, additionally, each member 28 is provided with an extension having a second aperture 29, as best shown in Figure 3. The implement 1 also includes a pair of lift arms 35, each including a main arm section 36 and a floating arm section 37 pivotally connected, as at 38, to the main arm section 36. The outer end of the floating arm section 37 is shiftably connected by link means 39 with the associated side beam at a point adjacent the end which carries the pivot pin 27. Each lifting arm 35 includes flanges 41 on each main arm section 36 for limiting the swinging movement of the floating arm section 37 in one direction. The floating arm section 37 preferably comprises two strap members 43 connected together by any suitable means so as to be held in spaced apart relation in positions to lie closely against opposite sides of the associated main arm section 36, being thereby disposed in a position to engage the flanges 41, which thereby serve as a stop for limiting the swinging movement of the floating arm section 37 in one direction. The strap members 43 are apertured at 42 in registry with an aperture formed in the associated main arm section 36, said apertures being in registry when the strap members 43 lie against the flanges 41. A detachable pin 45 may be inserted through said registering apertures for the purpose of locking the floating arm section 37 to the main arm section 36, whereby the two sections form a rigid arm structure to provide for applying down pressure against the associated side beam, as will be referred to later in detail. The end of each main lifting arm section 36 opposite the associated link 39 is provided with an elongated, generally rectangular slot 46 which is shaped to snugly fit the polygonal outer end of the associated rockshaft section 16. These parts are apertured so that when each arm is mounted in position on the associated rockshaft means 16, a pin 47 may be inserted through the apertures for locking each arm on its rockshaft section. Each arm may be disposed on its associated rockshaft section so as to extend either forwardly or rearwardly, as desired, according to whether the implement is disposed at the front or at the rear of the tractor. As best shown in Figure 3, a mounting bracket 50 is adapted to be fixed, as by a bolt 51 or the like, to each laterally outer end of the forward and longer tractor crossbar 6. Each bracket 50 is formed to provide a downwardly facing, generally U-shaped socket 52, and preferably each bracket 50 includes a pair of laterally spaced apart notched plates 53, the spacing between the plates being such as to lie at the outer sides of the pivot-supporting strap members 26 which form the inner ends of the side beam members 21 and 22, each pivot 27 extending laterally outwardly a short distance beyond the outer sides of the strap members 26. The notches 52 are disposed substantially underneath the associated rockshaft means 16. The plates 53 are provided with alined apertures 55 to receive the connecting pin 56 when the locking plate 28 is swung up into locking position to bring the aperture 29 in the plate 28 into alinement with the apertures 55.

The operation of the implement described above is substantially as follows.

When the implement is not in use and is detached from the tractor, it is adapted to rest on the ground, the inner ends of the side beams 21 and 22 being supported on the locking plates 28, which have feet 57 welded thereto, as best shown in Figure 2. The other end of the implement 1 rests on the ground, either by the front ends of the beams 21 and 22 resting directly on the ground or on the implement which is fixed to the crossbar 23. Assuming that the implement is to be attached to the front portion of the tractor, the tractor is driven into a position, such as shown in Figure 2, in which it may upon further advance be driven into the implement until the tractor-carried brackets 50 are in a position substantially directly above the pivot members 27. The lift arms 35 are then swung over into a position in which the slotted portions 46 of the lift arms can be slipped over the outer ends of the associated rockshaft members 16. A pin or the like, as indicated at 47, is then inserted in the openings 71 and 72 formed in the lifting arm sections 46 and the outer ends of the rockshaft sections 16, whereby the lift arms 35 are held in engagement with the rockshaft means 16. Then the implement is raised by operation of the power lift units 10, but since the link connections 39, extending between the outer ends of the arms 35 and the side beams 21 and 22, are made at points adjacent the pivots 27, the first movement imparted to the implement by the operation of the lift arms 35 results in raising the pivots 27 until they enter the sockets 52. When the pivots seat in the sockets 52, the locking plates are then swung upwardly from their lower and ground-engaging position until the openings 29 therein come into registry with the bracket openings 55, after which the pins 56 are inserted into the registering openings and thereby act through the lock plates 28 to hold the pivots locked or engaged in the sockets 52. This completes the connection of the implement with the tractor. As long as the lock plates 28 are locked in position by the pins 56, raising and lowering the lift arms 35 results in the raising or lowering of the outer end of the implement 1. If it is desired to attach the implement 1 to the rear end of the tractor, substantially the same steps are performed, except that the tractor is backed into position in between the side arms 21 and 22. The implement is detached from the tractor whenever desired merely by a reverse of the steps outlined above.

As shown in Figure 1, the floating lever arm 37 may be locked to the lifting arm 35 associated therewith by inserting the pin 45 through registering openings in the parts, whereby the power lift of the tractor may be utilized for applying down pressure or holding pressure for the purpose of securing deeper penetration, as in bulldozing jobs and the like. On the other hand, by removing the pin 45 the levers 37 may be disposed in their holding position whereby the implement 1, including any tools connected thereto, is permitted to float, that is, irrespective of the position of the hydraulic unit, the implement 1 and associated tools may be free to rise relative to the tractor at any time. However, when it is desired to raise or lift the tools all that it is necessary to do is operate the tractor power lift to swing the power lift arms 35 upwardly until the flanges 41 engage the bars 37. Further upward swinging of the arms 35 will then raise the outer end of the implement.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. For use with a tractor having a power lift including a movable power operated member, an implement adapted for attachment to such a tractor, comprising frame means disposable alongside the tractor, interengageable parts, one adapted to be mounted on the tractor and the other on said frame means adjacent one end thereof, motion-transmitting means connected with said frame means at a point between said other part and the other end of said frame means and adjacent said other part and adapted to be connected with said power lift member, whereby movement of the latter serves to raise said one end of said frame means and bring said parts into engagement, and means carried by said frame means and shiftable into locking relation with said one part for holding said parts in engagement, whereby subsequent operation of said power lift acts through said motion-transmitting means to raise and lower said implement about its connection with said one part on the tractor.

2. For use with a tractor having a power lift member movable relative to the tractor and an implement-receiving member carried by the tractor adjacent said power lift member, an agricultural implement adapted for attachment to such a tractor, said implement comprising frame means disposable alongside the tractor and to rest on the ground or floor when detached from the tractor, a part on the inner end of said frame means adapted to be engaged with said implement-receiving member on the tractor when the inner end of said frame means is raised, motion-transmitting means constructed to transmit both compressive forces and tensile forces and adapted to be connected between said power lift member and said frame means whereby movement of said power lift member in one direction is transmitted to the inner end of said frame means so as to raise said part into engagement with said implement-receiving member while the other end of said frame means remains on the ground or floor, further movement of said power lift member serving to raise said other end of the frame means, and means for holding said implement part in said implement-receiving means whereby movement of said power lift member in one direction or the other serves to raise or lower said other end of said frame means.

3. For use with a tractor having power lift mechanism including rockshaft means at each side of the tractor extending generally laterally with respect thereto, an implement adapted for attachment to such a tractor, comprising a generally U-shaped frame means having side beams disposable at opposite sides of the tractor and adapted to rest on the ground or floor when detached from the tractor, motion-transmitting means adapted to be connected with said rockshaft means at each side of the tractor and with said side beams adjacent the inner ends theerof, whereby operation of said rockshaft means in one direction serves to raise the inner ends of said beams into engagement with portions of the tractor while the outer end of said frame means remains on the ground or floor, and means for pivotally connecting the inner ends of said side beams with the tractor whereby, after said side beams have been thus pivotally connected with the tractor, operation of said power lift rockshaft means in one direction or the other serves to raise and lower the outer end of said frame means.

4. A tool carrier adapted to be detachably mounted on a tractor having a power lift, said tool carrier comprising frame means adapted to rest on the ground or floor when detached from the tractor, pivot means for swingably connecting one end of said frame means with the tractor, including interengageable parts, one on said frame means and the other adapted to be mounted on the tractor, one of said parts comprising a socket and the other part a pivot receivable in said socket, means for connecting said frame means at a point adjacent said pivot means with said power lift, whereby operation of the latter raises said one end of the frame means, while the other end remains on the ground or floor, until said pivot is received in said socket, whereupon further raising movement of said power lift serves to raise said other end of said frame means, and means acting between said frame means and the tractor-carried part for locking said interengageable parts in pivotal interconnection, whereby movement of said power lift in a lowering direction serves to lower said frame means about the axis defined by said pivotally interconnected parts, said locking means including a member swingable about the pivot axis of said pivot part into a position adjacent said socket part and detachable means for locking said socket member to said pivot part for holding said pivot part locked thereto.

5. For use with a tractor having a pair of power lift units, each including a movable part and means for operating the latter, the improvement which includes an implement attachable to the tractor and adapted to be controlled by said units, said implement comprising frame means having a pair of side arms, a pair of attachment brackets adapted to be fixed to the tractor, one at each side thereof and each having a generally downwardly facing socket, a socket-entering part on each side arm, means for connecting the movable parts of said power lift units with said side arms at such points thereon, relative to the center of gravity of the implement, that when said movable parts are operated the portions of said side arms carrying said socket-entering parts will be raised and said latter parts will be moved into said sockets, and means for locking said socket-entering parts in said sockets, whereby the end of said implement opposite said socket-entering parts will be raised and lowered by operating said power lift units.

6. For use with a tractor having power lift means including generally transversely disposed rockshaft means extending laterally outwardly at each side of the tractor, an implement adapted for attachment to such a tractor, comprising generally U-shaped frame means adapted to receive the tractor therebetween and to rest on the ground or floor when detached from the tractor, said frame means including a pair of laterally spaced apart side beams, each carrying a pivot member at its inner end, a socket member adapted to be attached to the tractor at each side thereof and constructed and arranged to receive the associated pivot member when said side beams are raised, motion-transmitting means connectible between said rockshaft means and said side beams for raising the pivot ends thereof into operative engagement in the socket members on the tractor, means for detachably locking said pivot members in the associated socket members, said socket members and said rockshaft means being disposed generally centrally of the tractor in a fore-and-aft direction and said frame means being adapted to embrace either the front end or the rear end of said tractor, and said motion-transmitting means comprising arms attachable to said rockshaft means so as to extend therefrom in a generally longitudinally extending direction, either forwardly or rearwardly of the rockshaft means, and link means connecting the outer ends of said arms with said side beams.

7. For use with a tractor having power lift means including generally transversely disposed rockshaft means extending laterally outwardly at each side of the tractor, an implement adapted for attachment to such a tractor, comprising generally U-shaped frame means adapted to receive the tractor therebetween and to rest on the ground or floor when detached from the tractor, said frame means including a pair of laterally spaced apart side beams, each carrying a pivot member at its inner end, a socket member adapted to be attached to the tractor at each side thereof and constructed and arranged to receive the associated pivot member when said side beams are raised, motion-transmitting means connectible between said rockshaft means and said side beams for raising the pivot ends thereof into operative engagement in the socket members on the tractor, and means for locking the pivot members in said socket members, comprising a lock plate pivotally mounted on each pivot member and means acting between each lock plate and the associated socket member for locking the associated plate thereto thereby holding the associated pivot member in engagement with the associated socket member.

8. An implement adapted to be connected with a tractor having a power lift rockshaft means at each side thereof, said implement including frame means comprising a pair of side beams and a transverse tool-receiving bar connected at its ends to the outer ends of said side beams, a pivot member carried at the inner end of each side beam, a lock plate mounted on each pivot member for swinging movement relative thereto, each lock plate having a ground-engaging portion whereby the frame means may be supported on the ground or floor when detached from the tractor, said side beams being spaced so as to receive the tractor therebetween, a lifting arm link-connected to each side beam adjacent the associated pivot member, means for detachably connecting said lifting arms with the associated rockshaft means, whereby operation of said rockshaft means in one direction acts through said arms and links for raising the inner ends of said side beams, generally upwardly relative to the tractor, a pair of socket members carried by the tractor and having sockets facing in a direction to receive said pivot members at the inner ends of said side beams whenever the latter are raised by operation of said power lift rockshaft means, and means for locking said pivot members in the associated socket members, whereby up-and-down movement of said lifting arms serves to raise and lower said frame means.

9. The invention set forth in claim 8, further characterized by each of said lifting arms including a floating arm link-connected with the associated side beam, stop means limiting the movement of each floating arm in one direction relative to the lifting arm, and detachable means for locking each floating arm against movement in the other direction relative to said lifting arm.

10. For use with a tractor having a power lift including a power-actuated rockshaft means disposed generally transversely of the tractor, an implement adapted for attachment to such a tractor, comprising generally fore-and-aft extending frame means adapted to be disposed generally longitudinally of the tractor, a mounting bracket adapted to be attached to the tractor adjacent said rockshaft means and including an implement-receiving portion in substantially vertical alinement with said rockshaft means, an attaching part on said implement frame means adapted to be engaged with said implement-receiving part, said frame means being adapted to be extended either forwardly or rearwardly relative to the tractor, a lifting arm attachable to said rockshaft means to extend either forwardly or rearwardly relative to the tractor, motion-transmitting means for connecting the outer end of said arm with said frame means adjacent said attaching part, whereby upward movement of said lifting arm serves to raise the inner end of said implement frame means so as to shift said attaching part into engagement with said implement-receiving means on said bracket, irrespective of whether said implement frame means and the associated lifting arm extends either forwardly or rearwardly relative to the tractor, and means for holding said attaching part in engagement with said bracket, whereby up-and-down movement of said lift arm serves to raise and lower said implement frame means.

11. An implement adapted to be pivotally connected with a tractor for generally vertical swinging relative thereto, said implement comprising generally U-shaped frame means including side beams disposable at opposite sides of the tractor, each carrying a pivot member at its inner end, a socket member adapted to be attached to the tractor at each side thereof and constructed and arranged to receive the associated pivot member when said side beams are raised, and means for detachably locking said pivot members in the associated socket members, said locking means comprising a lock plate pivotally mounted on each pivot member and means acting between each lock plate and the associated socket member for locking the associated plate thereto thereby holding the associated pivot member in engagement with the associated socket member.

12. The implement defined in claim 11, further characterized by each of said lock plates having a foot section whereby, when the side beams are disconnected from the tractor, the inner ends of said side beams may be supported on said lock plates.

13. The combination with a tractor having a power lift including a movable member adapted to raise and lower an implement, of an implement-receiving member disposed on the tractor adjacent said first member, an agricultural implement connected with said tractor and comprising frame means disposed alongside the tractor and adapted to rest on the ground or floor in one position relative to the tractor, a part on the inner end of said frame means releasably engageable with said implement-receiving member on the tractor, motion-transmitting means constructed to transmit both compressive forces and tensile forces and connected between said power lift member and said frame means, whereby movement of said power lift member in one direction is adapted to raise said part into engagement with said implement-receiving member, as when said inner end is disconnected from the implement-receiving member, while the other end of said frame means remains on the ground or floor, further movement of said power lift member in said one direction serving to react against said implement-receiving member and raise said other end of the frame means, and means holding said implement part in said implement-receiving means, whereby movement of said power lift member in the other direction serves to lower said other end of said frame means.

14. For use with a tractor having power lift mechanism including rockshaft means at each side of the tractor extending generally laterally with respect thereto, an implement adapted for attachment to such a tractor, comprising a generally U-shaped frame means having side beams disposable at opposite sides of the tractor and adapted to rest on the ground or floor when detached from the tractor, motion-transmitting means adapted to be connected with said rockshaft means at each side of the tractor and with said side beams adjacent the inner ends thereof, whereby operation of said rockshaft means in one direction serves to raise the inner ends of said beams into engagement with portions of the tractor while the outer end of said frame means remains on the ground or floor, and means for pivotally connecting the inner ends of said side beams with the tractor, comprising interengageable parts at each side of the tractor, one on each side beam of said frame means and the other on the adjacent portion of the tractor, whereby, after said side beams have been thus pivotally connected with the tractor, operation of said power lift rockshaft means in one direction or the other serves to raise and lower the outer end of said frame means.

15. For use with a tractor having a power lift member movable relative to the tractor and an implement-receiving member carried by the tractor adjacent said power lift member, an agricultural implement adapted for attachment to such a tractor, said implement comprising frame means disposable alongside the tractor and to rest on the ground or floor when detached from the tractor, a part on the inner end of said frame means adapted to be engaged with said implement-receiving member on the tractor when the inner end of said frame means is raised, motion-transmitting means constructed to transmit both compressive forces and tensile forces and adapted to be connected between said power lift member and said frame means whereby movement of said power lift member in one direction is transmitted to the inner end of said frame means so as to raise said part into engagement with said implement-receiving member while the other end of said frame means remains on the ground or floor, further movement of said power lift member serving to raise said other end of the frame means, and locking means for holding said implement part in said implement-receiving member, said locking means comprising a movable member connected with said implement part and means to connect said movable member with said implement-receiving member, whereby movement of said power lift member in one direction or the other serves to raise or lower said other end of said frame means.

16. The combination with a tractor having a power lift including a movable member adapted to raise and lower an implement, of an implement-receiving member disposed on the tractor adjacent said first member, an agricultural implement connected with said tractor and comprising frame means disposed alongside the tractor and adapted to rest on the ground or floor in one position relative to the tractor, a part on the inner end of said frame means releasably engageable with said implement-receiving member on the tractor, motion-transmitting means constructed to transmit both compressive forces and tensile forces and connected between said power lift member and said frame means, whereby movement of said power lift member in one direction is adapted to raise said part into engagement with said implement-receiving member, as when said inner end is disconnected from the implement-receiving member, while the other end of said frame means remains on the ground or floor, further movement of said power lift member in said one direction serving to react against said implement-receiving member and raise said other end of the frame means, and locking means holding said implement part in said implement-receiving member, said locking means comprising a movable member connected with said implement part and means to connect said movable member with said implement-receiving member, whereby movement of said power lift member in the other direction serves to lower said other end of said frame means.

References Cited in the file of this patent

UNITED STATES PATENTS

| | | |
|---|---|---|
| 2,481,898 | Bevan | Sept. 13, 1949 |
| 2,576,779 | Court | Nov. 27, 1951 |